United States Patent

Iwasaki et al.

[11] Patent Number: 6,011,898
[45] Date of Patent: Jan. 4, 2000

[54] VIDEO SIGNAL EDITING APPARATUS

[75] Inventors: Kenichi Iwasaki; Mitsugu Yoshihiro; Hirofumi Murakami; Noboru Yanagita, all of Kanagawa, Japan

[73] Assignee: Sony Corporation, Tokyo, Japan

[21] Appl. No.: 08/900,348

[22] Filed: Jul. 25, 1997

Related U.S. Application Data

[62] Division of application No. 08/624,506, filed as application No. PCT/JP95/01618, Aug. 14, 1995.

[30] Foreign Application Priority Data

Aug. 12, 1994 [JP] Japan ..................... 6-190749

[51] Int. Cl.$^7$ ............... H04N 5/93; H04N 5/91
[52] U.S. Cl. ................. 386/95; 386/52; 386/55
[58] Field of Search .................. 386/95, 68, 52, 386/46, 69, 67, 1, 4, 55; H04N 5/93, 5/91

[56] References Cited

U.S. PATENT DOCUMENTS

| | | | |
|---|---|---|---|
| 5,122,886 | 6/1992 | Tanaka | 386/46 |
| 5,282,049 | 1/1994 | Hatakenaka et al. | 386/68 |
| 5,477,264 | 12/1995 | Sarbadhikari et al. | 348/222 |
| 5,546,191 | 8/1996 | Hibi et al. | 386/52 |
| 5,727,112 | 3/1998 | Kellar et al. | 386/52 |

*Primary Examiner*—Robert Chevalier
*Attorney, Agent, or Firm*—Frommer Lawrence & Haug, LLP.; William S. Frommer

[57] ABSTRACT

The present invention has as its object to reduce the time and and effort in the work of finding a portion necessary for editing work from a video signal recorded on a video tape. A VTR apparatus (12) reproduces a video signal and sampling data showing the start and end of the shot from a video tape (120). A VP circuit (22) reduces the size of the video signal. A detection circuit (24) detects the boundaries of scenes or important portions based on the reproduced sampling data. The sampling memory (30) samples and records the video signal reduced by the VP circuit (22) at a timing of detection of the boundaries of the scene or important portions by the detection apparatus (24). A display device (34) displays the video signal stored in the sampling memory (30) in a predetermined array along with a time code etc.

4 Claims, 4 Drawing Sheets

VIDEO SIGNAL EDITING APPARATUS

This application is a division of application Ser. No. 08/624,506, filed Jun. 21, 1996, which is a 371 of PCT/JP95/01618 filed Aug. 14, 1995.

TECHNICAL FIELD

The present invention relates to a video signal recording apparatus and a video signal editing apparatus which facilitate seek operations of starting points and ending points of a video signal, which are important in editing work.

BACKGROUND ART

Broadcasting stations, for example, have traditionally made use of video signal editing apparatuses for reading a video signal of a digital format from a video tape or a hard disk and editing the same for producing a video for news, for example.

Some video signal editing apparatuses use a video tape as a recording medium. A video tape is superior in the point that it can record a video signal of a long duration, but does not allow random access of any portion of the video signal.

Other video signal editing apparatuses use a hard disk as the recording medium. A hard disk is excellent in random accessibility and therefore allows large numbers of portions of a video signal to be read in a short time. However, at the present time, it does not allow recordal of a video signal as long in duration as with a video tape.

Accordingly, it is convenient to use a video tape and a hard disk in association, first record the long duration video signal which is shot on the video tape, then find and move only the portion in the video signal recorded on the video tape necessary for the actual editing to the hard disk and read the relevant portions from the hard disk for use for the editing work.

As mentioned above, it is convenient to use a video tape and a hard disk in association during editing work, but it takes a lot of work to find the portions necessary for the editing from the long duration video signal recorded on the video tape.

That is, the editor is required to find the portions necessary for editing by reproducing the video signal while fast forwarding (FWD) or rewinding (REV) the video tape and moving those portions to the hard disk. A long time and much labor are taken for this work.

To facilitate this work, there is known for example the "Method of Fetching Editing Information" disclosed in Japanese Examined Patent Publication (Kokoku) No. 61-44437. This method reduces in size and successively displays on a single screen the frame of a video signal reproduced at a certain point of time and the several frames of the video signal reproduced before it to thereby provide an environment for editing a video of equal detail as when editing movie film.

With the method disclosed in Japanese Examined Patent Publication (Kokoku) No. 61-44437, however, even though it is possible to display several adjoining frames of a video signal being reproduced at a certain point of time, it is not possible to fetch and display from the video tape as a whole a broader range of the video signal, for example, just the portions of the video signal where the scenes change.

Further, for example, Japanese Examined Patent Publication (Kokoku) No. 61-44437 describes a method of reducing in size and displaying on a single screen a plurality of images at the boundaries of scenes in a video signal.

However, Japanese Examined Patent Publication (Kokoku) No. 61-44437 does not specifically disclose how to detect the boundaries of the scenes in a video signal. Further, with this method, it is not possible to designate important portions included in a scene.

DISCLOSURE OF INVENTION

The present invention was made in consideration with the problems of the prior art mentioned above and has as an object thereof to provide a video signal recording apparatus and a video signal editing apparatus which can reduce the time and labor of the work of finding portions necessary for editing from a video signal recorded on a video tape.

Another object of the present invention is to provide a video signal recording apparatus and a video signal editing apparatus which move portions found from a video signal recorded on a video tape to a randomly accessible recording medium for use for the editing work and thereby can improve the efficiency of editing work.

The video signal recording apparatus according to the present invention, to overcome the above problems, has an operation signal receiving means for receiving an operation signal from the outside; a video signal generating means for generating a video signal in accordance with the received operation signal; and a recording means for recording the generated video signal on a predetermined recording, medium in correspondence with the received operation signal.

In the video signal recording apparatus according to the present invention, the operation signal receiving means receives an operation signal from the outside such as on the operation of the cameraman for starting and stopping recording and operation for showing the position of an important scene at the time of editing.

The video signal reproducing means generates a video signal of the scenes which are shot.

The recording means records together with the video signal on a video tape or other recording medium a signal including the correspondence between the video signal generated by the video signal generating means and the timing with the operation signal received by the operation signal receiving means, information on the scenes of the video signal, and information showing the important parts of the video signal.

Preferably, the operation signal receiving means receives at least a starting and ending signal showing the start and end of generation of the video signal and a designation signal for designating a predetermined position of the generated video signal and the recording means records the received starting and ending signal and designation signal or one of the same on the recording medium in correspondence with the video signal.

The video signal editing apparatus according to the present invention has a reproducing means for reproducing a video signal and an operation signal showing at least the start and end of generation of the video signal, a predetermined position of the generated video signal, or one of the same from a predetermined recording medium on which the video signal and the operation signal are recorded in correspondence, an image reducing means for reducing in size an image of the generated video signal to generate a reduced video signal; a detecting means for detecting the operation signal; a monitor means for displaying the image; and a display means for successively displaying in a predetermined array on the monitor means the reduced video signal corresponding to the detected operation signal.

In the video signal editing apparatus according to the present invention, the recording means reproduces the video signal and operation signal from the recording medium on which these signals have been recorded by the above-mentioned video signal recording apparatus according to the present invention.

The image reducing means suitably thins the data from the reproduced video signal so as to reduce in size the image and generate a reduced video signal.

The detecting means detects that the operation signal shows the start or end of the recording or an important scene at the time of editing.

The display means successively displays a reduced video signal corresponding to the detected operation signal in for example a window on a screen.

Preferably, there are further provided a randomly accessible recording means, a pointing means for designating a reduced video signal displayed on the monitor means, and a recording control means for recording on the recording means the video signal for a predetermined period corresponding to the designated reduced video signal.

Preferably, the recording control means causes the video signal to be recorded on the recording means from a point of time earlier than the designated reduced video signal.

BEST MODE FOR CARRYING OUT THE INVENTION

First Embodiment

Below, a first embodiment of the present invention will be explained.

Figure 1:
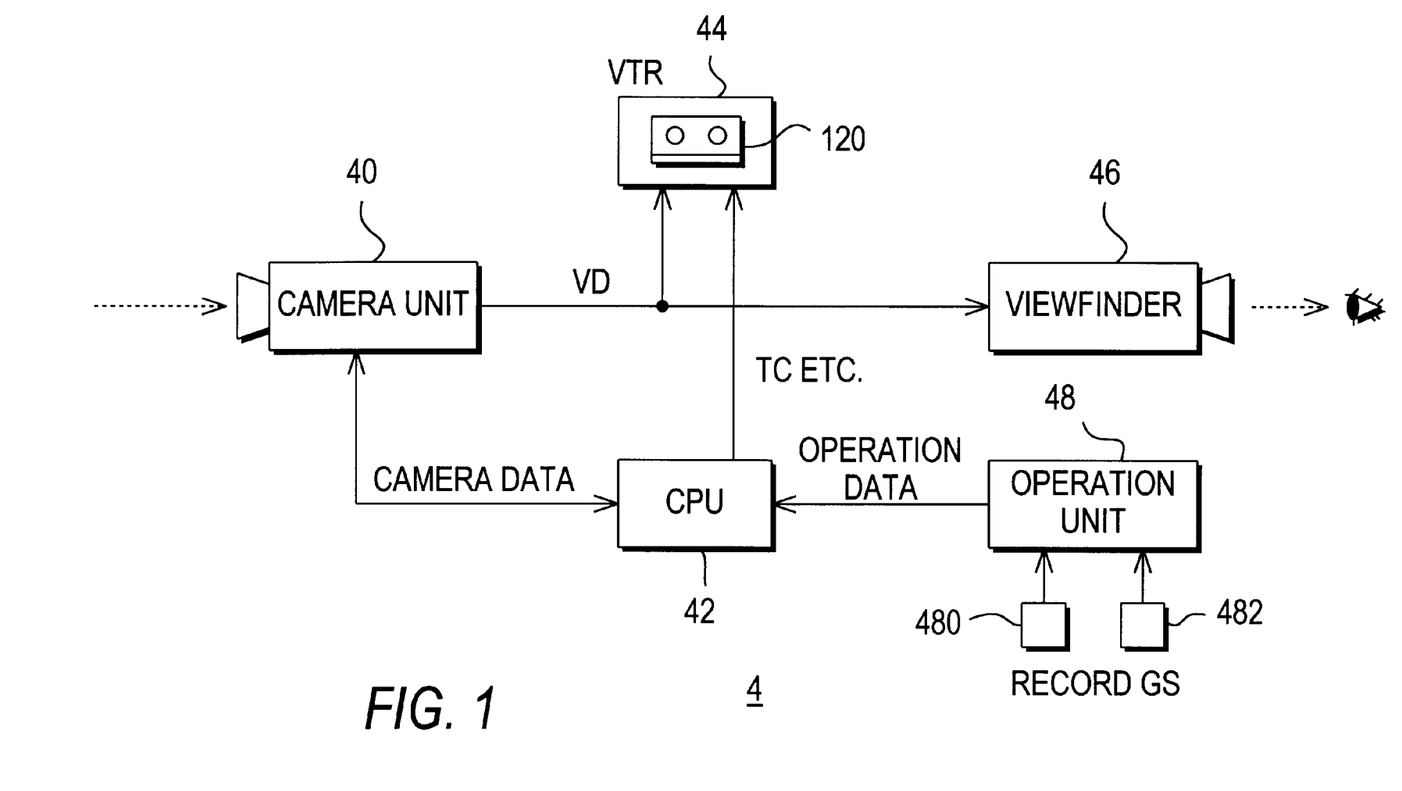
FIG. 1 is a view showing the configuration of a video signal recording apparatus according to the present invention.

FIG. 1 is a view showing the configuration of a video signal recording apparatus 4 according to the present invention.

As shown in FIG. 1, the video signal recording apparatus 4 is comprised of a camera unit 40, a control unit (CPU) 42, a VTR apparatus 44, a viewfinder 46, and an operation unit 48. The operation unit 48 has connected to it a recording switch 480 and "good scene" (GS) switch 482.

The video signal recording apparatus 4 uses these components to record the sampling data indicating the starting point of the shot, the ending point of the shot, the important portions ("good scenes"), etc. and the video signal on a video tape 120.

The operation unit 48 is operated by the cameraman through the recording switch 480 and "good scene" switch 482 and outputs the content of that operation to the control unit 42 as operation data.

The control unit 42 controls the camera unit 40 and the VTR apparatus 44 based on the operation data input from the operation unit 48.

Further, the control unit 42 generates time code (TC) data and sampling data to be recorded on the video tape 120 along with the video signal and outputs the same to the video tape 120.

The sampling data generated by the control unit 42 includes for example whether or not the cameraman has depressed the recording switch, that is, the camera starting and ending data showing the starting point and ending point of a shot, and whether or not the cameraman has depressed the "good scene" switch 482, that is, the "good scene" data showing the positions of the video which the cameraman considers important.

The camera unit 40 is for example a video camera using a CCD device or picture tube. It shoots a scene under the control of the control unit 42 and generates a video signal for output to the VTR apparatus 44 and viewfinder 46.

The viewfinder 46 displays the video signal input from the camera unit 40 to the cameraman.

The VTR apparatus 44 records on the video tape 120 the time code data and sampling data input from the control unit 42 and the video signal input from the camera unit 40 under the control of the control unit 42.

Figure 2A:
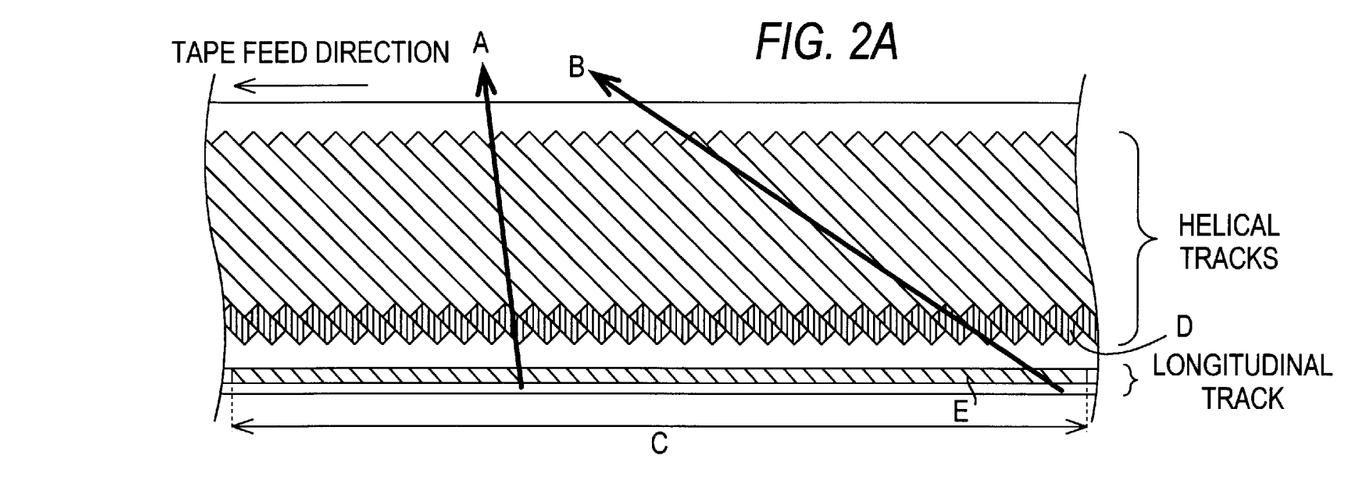
FIG. 2A is a view of the recording positions of sampling data on the video tape 120 shown in FIG. 1.

FIG. 2A is a view of the recording positions of sampling data on the video tape 120 shown in FIG. 1.

Figure 2B:
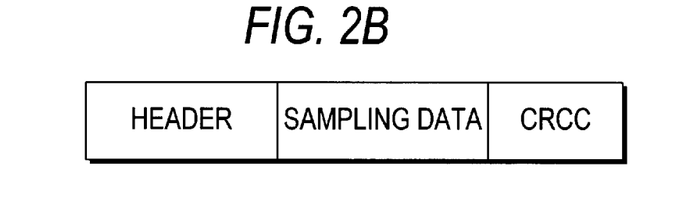
FIG. 2B is a view of a first format of the sampling data shown in FIG. 2A.

FIG. 2B is a view of a first format of the sampling data shown in FIG. 2A.

Figure 2C:
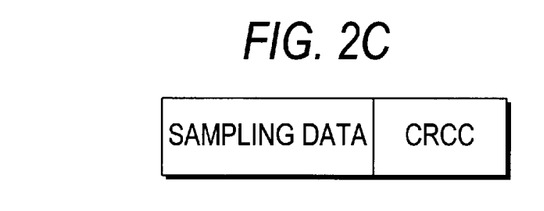
FIG. 2C is a view of a second format of the sampling data shown in FIG. 2A.

FIG. 2C is a view of a second format of the sampling data shown in FIG. 2A.

As shown by the hatching in FIG. 2A, the sampling data generated by the control unit 42 is recorded on a track running along the longitudinal direction of the video tape 120 (longitudinal track) and at least one helical track of the video tape 120 at a rate of one data per track at the predetermined position d.

Note that the sampling data may be recorded also at AUX regions in the helical tracks rather than the positions d of the helical tracks of the video tape 120. When recording the sampling data in the AUX regions, the sampling data is recorded at different positions at each helical track.

Further, when the recording switch 480 is depressed or released and when the "good scene" switch 482 is depressed, data showing this state is recorded as the sampling data continuously for a certain period c, for example, 3 seconds.

As the longitudinal track for recording the sampling data, use is made for example of a que track or time code track of the SMPTE (Society of Motion Picture and Television Engineering).

When recording sampling data on the que track and helical track, as shown in FIG. 2B, a header is placed at the front of the main body of the sampling data so as to differentiate the sampling data and the other data and, further, an error correction code (CRCC) for correcting errors in the sampling data is placed at the rear.

When recording on the time code track, the sampling data is recorded in the standard user region. Accordingly, as shown in FIG. 2C, unlike with the case of recording on the que track and helical track, there is no need to place a header in front of the main body of the sampling data. It is enough to place just the error correction code at the rear.

In the sampling data shown in FIG. 2A and FIG. 2B, the 0-th bit (0 origin) is used for example as the starting and ending bit showing if the recording switch 480 has been depressed.

The starting and ending bit becomes the logical value "1" for several seconds, for example, 3 seconds, after the cameraman starts depressing the recording switch 480 and becomes the logical value "0" in other cases.

Further, for example, the 1st bit is used as the "good scene" bit showing if the "good" scene, switch 482 is being depressed. It becomes the logical value "1" for a certain period c, for example, 3 seconds, when the cameraman starts depressing the "good scene" switch 482 and becomes the logical value "0" in other cases.

Note that in the video signal recording apparatus 4, the camera unit 40 corresponds to the video signal reproducing means according to the present invention, the operation unit 48, recording switch 480, and "good scene" switch 482 correspond to the operation signal receiving means according to the present invention, and the VTR apparatus 44 corresponds to the recording means according to the present invention.

The operation of the video signal recording apparatus 4 will be explained below.

First, for example, an explanation will be made of the operation of the video signal recording apparatus 4 in the case of coverage of for example a sports event where the cameraman is continuously depressing the recording switch 480 of the video signal recording apparatus 4 and recording the video signal on a video tape 120.

When an important scene is encountered in the sports event, for example, when one side scores in a soccer game, the cameraman immediately depresses the "good scene" switch 482 while still depressing the recording switch 480 so as to show that the scene shot at that point of time is right after an important portion.

When the "good scene" switch 482 is depressed, the control unit 482 outputs that fact to the control unit 42 as operation data.

The control unit 42 makes the logical value of the "good scene" bit (1st bit of sampling data) "1" for 3 seconds for example after the "good scene" switch 482 is depressed.

Note that the control unit 42 makes the starting and ending bit (0-th bit of sampling data) the logical value "1" for 3 seconds from the start of depression of the recording switch 480 regardless of whether the "good scene" switch 482 is depressed or not and makes it the logical value "0" in other cases.

Further, the control unit 42 generates an error correction code and places it at the rear of the sampling data and, if necessary, places a header at the front, and outputs the result to the VTR apparatus 44.

The VTR apparatus 44 records the video signal and sampling data on the helical tracks of the video tape 120 and records the time code data and sampling data on the longitudinal track.

Next, an explanation will be made of the operation of the video signal recording apparatus 4 in the case of shooting a broadcast program where the cameraman frequently and repeatedly starts and stops shooting in each scene.

In such a case, the cameraman records the video signal on the video tape 120 by repeatedly depressing and releasing the recording switch 480 in each scene.

The control unit 42 makes the starting and ending bit the logical value "1" for 3 seconds for example after the recording switch 480 has been depressed and returns it to the logical value "0" after the 3 seconds elapse.

Note that the control unit 42 makes the logical value of the "good scene" bit "1" within the 3 seconds from when the "good scene" switch 482 is depressed and leaves the logical value of the "good scene" bit as "0" in other cases.

Further, the control unit 42 adds an error correction code etc. to the sampling data and outputs the result to the VTR apparatus 44, while the VTR apparatus 44 records the sampling data and error correction code etc. input from the control unit 42.

As explained above, since the video signal recording apparatus 4 is configured so as to record the sampling data not only on the helical tracks, but also the longitudinal track, it is possible to reliably read the sampling data from the longitudinal track even when playing back the video tape 120 at a slow speed as shown by the arrow a in FIG. 2A or playing back the video tape 120 at a fast speed as shown by the arrow b in FIG. 2B and there is a chance that the sampling data of the helical tracks cannot be read.

Further, according to the video signal recording apparatus 4, the cameraman can record on the video tape 120 data showing the boundaries of the scenes shot by just depressing the recording switch 480 and can record on the video tape 120 the positions of important portions by a simple operation. Accordingly, when reproducing the video signal, it is possible to easily find the boundaries of important scenes and important portions in editing work by detecting the 0-th bits and 1st bits of the sampling data.

Note that in FIG. 2A, the case is shown of the sampling data recorded at the same positions on all the helical tracks of the video tape 120 from the viewpoint of simplification of the illustration, but as explained above, when the sampling data is recorded in the AUX regions, it does not have to be recorded at the same positions of the helical tracks.

Further, the sampling data does not have to be recorded at all of the tracks of the video tape 120. For example, the video signal recording apparatus 4 may be configured so that the sampling data is recorded at any position every predetermined number of tracks.

Further, the sampling data does not have to include both of the starting and ending bit and the "good scene" bit. The video signal recording apparatus 4 may be configured so that just one of these is recorded on the video tape 120.

Further, the explanation was made of the case where the apparatus is configured to make the starting and ending bit the logical value "1" for a predetermined period after the recording switch 480 is depressed, but for example the video signal recording apparatus 4 may be configured so that the starting and ending bit is made the logical value "1" for exactly a predetermined period after the recording switch 480 is released.

Further, the video signal recording apparatus 4 may be configured so as to further increase the number of bits constituting the sampling data and be able to record on the video tape 120 information other than whether the recording switch 480 and "good scene" switch 482 are being depressed.

Second Embodiment

Below, a second embodiment of the present invention will be explained.

Figure 3:
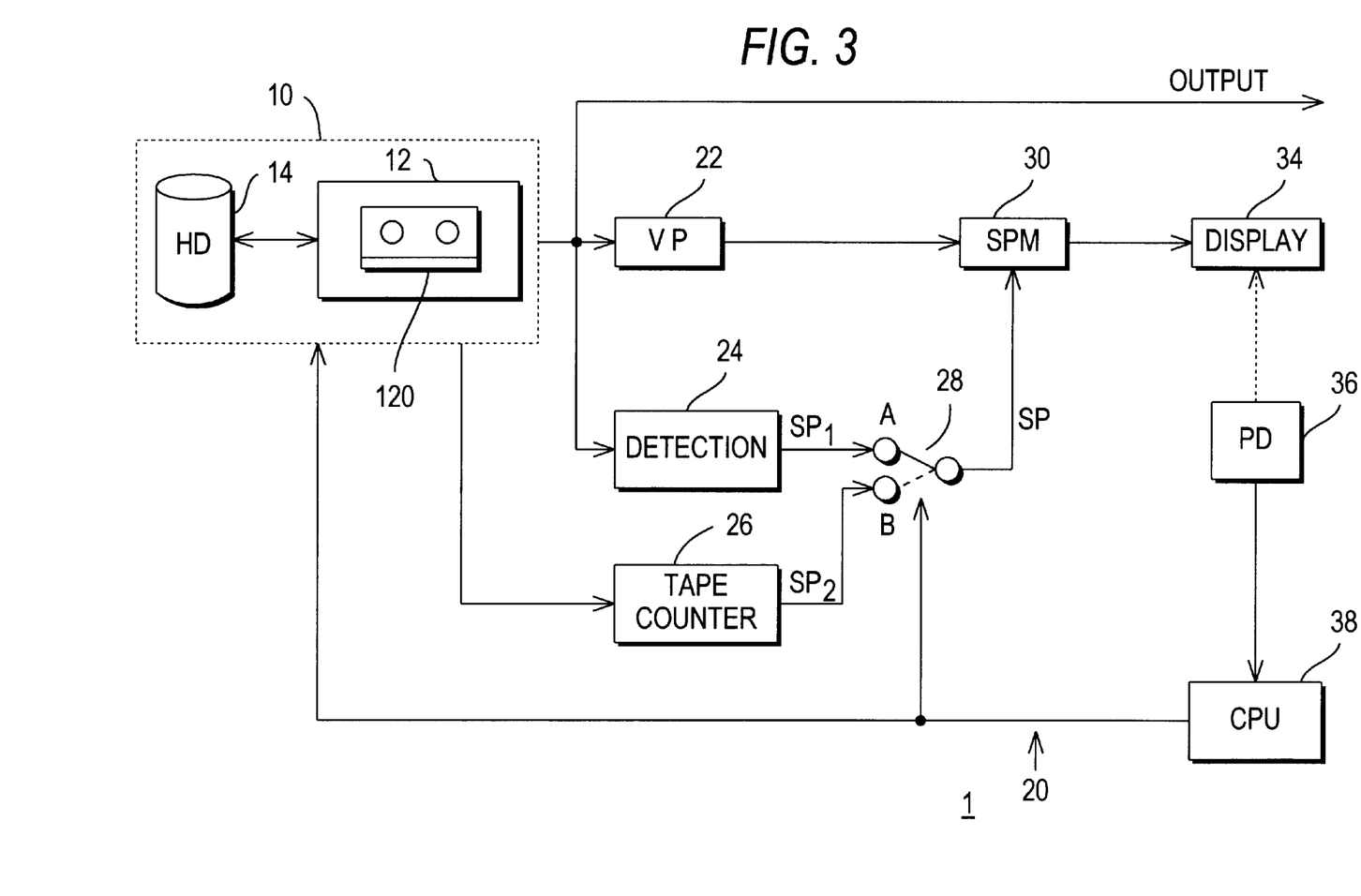
FIG. 3 is a view showing the configuration of a video signal editing apparatus of the present invention.

FIG. 3 is a view showing the configuration of a video signal editing apparatus 1 of the present invention.

As shown in FIG. 3, the video signal editing apparatus 1 is constituted by a video recording and reproduction apparatus 10 and a video processing apparatus 20.

The video recording and reproduction apparatus 10 is constituted by a VTR apparatus 12 and a hard disk device (HD device) 14.

The video signal editing apparatus 1 edits the video signal recorded by the video signal recording apparatus 4 shown in the first embodiment, for example, on a video tape 120 using sampling data recorded by the video signal recording apparatus 4 together with it.

The VTR apparatus 12 reproduces the video signal, comprised for example of one or more scenes and the sampling data recorded on the video tape 120 by the video signal recording apparatus 4 under the control of the control unit 38, for example, and outputs them to the hard disk device 14, a video processor device (VP circuit) 22, and a detection device 24.

Further, the VTR apparatus 12 records the video signal and sampling data input from the HD device 14.

The HD device 14 records the video signal and sampling data input from the VTR apparatus 12, reproduces the recorded video signal and sampling data, and outputs the reproduced video signal to the VTR apparatus 12, VP circuit 22, and detection apparatus 24 under the control of the control unit 38.

The video processing apparatus 20 is constituted by the VP circuit 22, a detection circuit 24, tape counter 26, switch 28, sampling memory (SPM) 30, display device 34, pointing-device (PD) 36, and control circuit 38.

The VP circuit 22 performs the processing for thinning of the pixels of a video signal input from the video signal editing apparatus 10 by a predetermined rate, for example, at a rate enabling the content thereof to be distinguished when displayed in a frame 342 on the screen of the display device 34 mentioned later by referring to FIG. 4, so as to reduce in size the image on the display device 34.

The detection device 24 detects the boundaries of scenes (boundary points) and important portions in a video signal input from the video signal editing apparatus 10 and generates a sampling signal $SP_1$ defining the timing for causing sampling of the video signal corresponding to the boundary points in the sampling memory 30.

The detection device 24 detects the point where the 0-th bit of the sampling data shown in FIG. 2A to 2C changes from the logical value "0" to the logical value "1" as a boundary point or detects the point where the 1st bit of the sampling data changes from the logical value "0" to the logical value "1" as an important portion, for example.

The tape counter 26 counts the video tape running distance of the video tape 120 and generates a sampling signal $SP_2$ defining the timing for causing sampling of the video signal in the sampling memory 30 every time the count of the video tape increases or decreases by a certain number.

The switch 28 selects the sampling signal $SP_1$ generated by the detection device 24 or the sampling signal $SP_2$ generated by the tape counter 26 and outputs the selected signal (sampling signal SP) to the sampling memory 30 under the control of the control unit 38.

The sampling memory 30 samples the video signal thinned by the VP circuit 22 according to the sampling signal SP input from the switch 28 and stores the same in units of frames.

The display device 34 displays the video signal stored in the sampling memory 30 with an arrangement as will be explained later by referring to for example FIG. 4B to FIG. 4D.

The pointing device 36 is a device such as a mouse which designates a video signal displayed on the display device 34 by the operation by the operator of the video signal editing apparatus 1.

The control circuit 38 performs the predetermined processing based on the signals input from the components of the video signal editing apparatus 1 and controls the same. Note that, for simplification of the illustration, in FIG. 3, the connections between the control unit 38 and the other components of the video signal editing apparatus 1 are suitably omitted.

Among the components of the above-mentioned video signal editing apparatus 1, the VTR apparatus 12 corresponds to the reproducing means according to the present invention; the VP circuit 22 corresponds to the image reducing means according to the present invention; the display device 34 corresponds to the monitor means according to the present invention; and the detection device 24, the tape counter 26, and the switch 28 correspond to the display means according to the present invention.

Below, the operation of the video signal editing apparatus 1 will be explained by referring to FIG. 4.

Figure 4A:
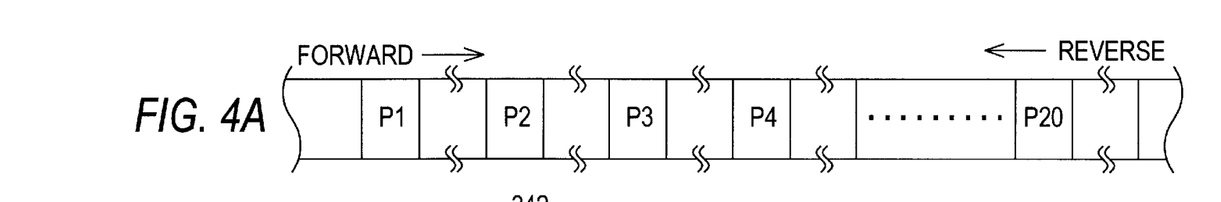
FIG. 4A shows a video signal sampled from the video signal.
Figure 4B:
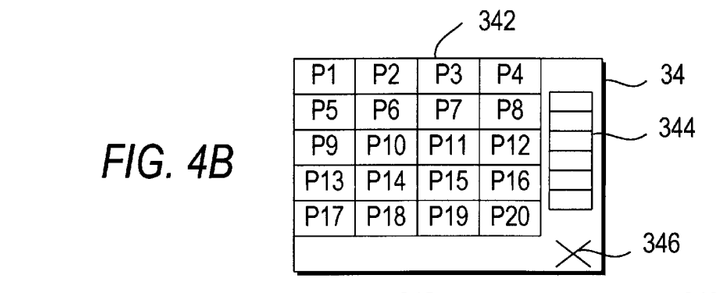
FIG. 4B shows the overall image which is displayed on the display device.
Figure 4C:
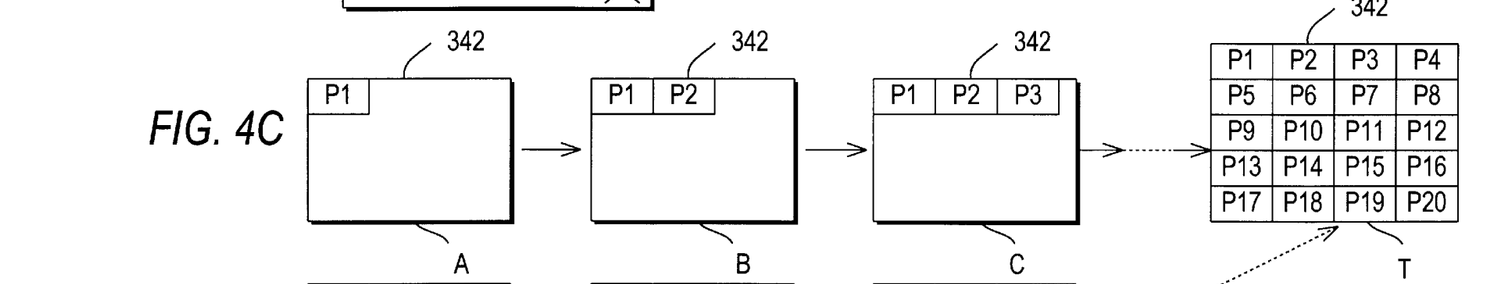
FIG. 4C shows a change of the image in a frame at fast forwarding.
Figure 4D:
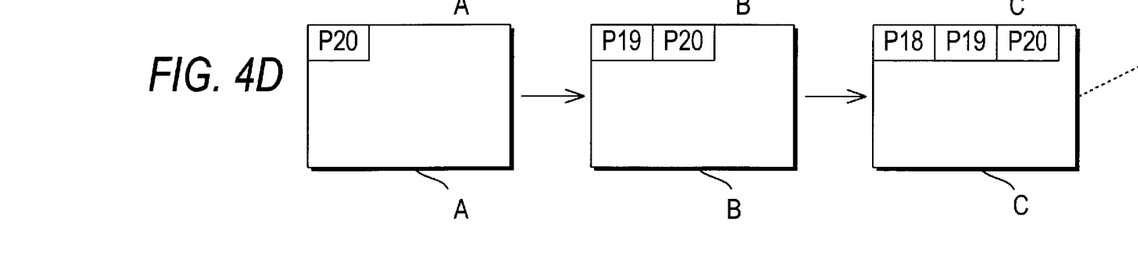
FIG. 4D shows a change of the image in a frame at rewinding.

FIG. 4A shows a video signal sampled from the video signal, FIG. 4B shows an overall image which is displayed on the display device 34, FIG. 4C shows a change of the image in a frame 342 at fast forwarding (FWD); and FIG. 4D shows a change of the image in a frame 342 at rewinding (REV).

First, an explanation will be made of a case where the video signal editing apparatus 1 reproduces a video signal at fast forward from the video tape 120 and samples and displays the reproduced video signal every predetermined running distance.

In this case, the control unit 38 makes the switch 28 select the contact b side to make it output the sampling signal $SP_2$ generated by the tape counter 26 as the sampling signal SP to the sampling memory 30.

When the VTR apparatus 12 reproduces a video signal at fast forward from the video tape 120, the video signal is output in a forward direction shown in FIG. 4A. That is, the video signal is output from the video apparatus 12 in an order of the video signals P1, P2, . . . , P20.

Note that, here, the video signals P1 to P20 indicate the video signals after the video signals:are thinned and reduced in size by the VP circuit 22 and further sampled by the sampling memory 30 etc.

During the period when the VTR apparatus 12 reproduces the video signal from the video tape 120, the tape counter 26 counts the running distance of the video tape 120. The calculated value of the running distance corresponds to the time for reproduction from the start of reproduction of the video tape 120.

Where for example the duration of the video signal is input to the control unit 38, the tape counter 26 generates a sampling signal SP ($SP_2$) for every count obtained by dividing the total duration of the video signal equally by 20, every count simply corresponding to a predetermined running distance (certain time interval), or every count obtained by dividing a predetermined range of the video signal equally by 20 under the control of the control unit 38.

The sampling memory 30 samples the video signal thinned by the VP circuit 22 in synchronization with the sampling signal SP, that is, the sampling signal $SP_2$ generated corresponding to the count of the tape counter 26 as explained above or the sampling signal $SP_1$ corresponding to the boundary points, and generates and stores the video signals P1 to P20.

The video signals P1 to P20 are read from the sampling memory 30 by the display device 34 under the control of the control unit 38 and as shown in FIG. 4B displayed in the frame 342 of the screen of the display device 34.

The video signals to the frame 342 are successively displayed packed to the left top end of the frame 342 as shown by for example the images a, b, c, and t of FIG. 4C, whenever the video signals P1 to P20 are generated, along with the corresponding count of the tape counter 26 and time code or one of the same.

Below, an explanation will be made of a case where the video signal editing apparatus 1 reproduces a video signal a fast forward from the video tape 120 and samples and displays the reproduced video signal every predetermined running distance.

Also in this case, the control unit 38 makes the switch 28 select the contact b side.

Where the video apparatus 12 reproduces the video signal at rewind from the video tape 120, the video signal is output in a reverse direction shown in FIG. 4A. That is, the video signal is output from the VTR apparatus 12 in the order of the video signals P20, P19, . . . , P1.

During a period where the VTR apparatus 12 reproduces the video signal at rewind from the video tape 120, the tape counter 26 counts the running distance of the video tape 120.

The tape counter 26 generates the sampling signal SP ($SP_2$) in the same way as the case of the reproduction at fast forward, and the sampling memory 30 generates and stores the video signals P1 to P20 according to this sampling signal.

The video signals P20 to P1 are read from the sampling memory 30 by the display device 34 under the control of the control unit 38 and, as shown in FIG. 4D, displayed in the frame 342 of the screen of the display device 34.

The video signals to the frame 342 are successively displayed packed to the left top end of the frame 342 as shown by for example the images a, b, and c of FIG. 4D, whenever the video signals P20 to P1 are generated, along with the count of the tape counter 26 etc. and finally become the same as the image t of FIG. 4C.

Generating and displaying the video signals P1 to P20 at each predetermined tape running distance in the above way is for example convenient when seeking a portion necessary for editing in a certain scene.

Moreover, the same operation as explained above can be used to generate an image in the frame 342 when reproducing a video signal from the video tape 120 at the usual speed.

Below, an explanation will be made of a case where the video signal is reproduced at fast forward in the forward direction from the VTR apparatus 12 and the video signal is sampled at the boundary points and important portions of the reproduced video signal.

In this case, the control unit 38 makes the switch 28 select the contact a side to makes it output the sampling signal $SP_1$ from the detection device 24 as the sampling signal SP to the sampling memory 30.

During the period when the VTR apparatus 12 reproduces at fast forward the video signal and sampling data from the video tape 120, the detection device 24 detects the change of the 0-th bits and 1st bits of the reproduced sampling data to detect boundary points and important portions from the video signal.

The detection device 24 produces the sampling signal SP ($SP_1$) when detecting a boundary point or important portion.

The sampling memory 30 generates and stores the video signals P1 to P20 according to this sampling signal.

The produced video signals P1 to P20 and count of the tape counter 26 etc. are displayed in the frame 342 of the screen of the display device 34 in the same way as the case where the sampling signal is generated every predetermined running distance explained above.

Note that the processing for reproducing the video signal from the video tape 120 at rewind or at a usual speed and performing the sampling at the boundary points can also be realized by a combination of the processing for performing the sampling every predetermined running distance of the video tape 120 explained above and the processing for reproducing the video signal at fast forward and performing the sampling at the boundary points.

When producing the video signals P1 to P20 by sampling at the boundary points in this way, it is possible to see at one glance which video signals fall in the scenes.

Note that instead of the HD device 14, use may be made of another randomly accessible recording apparatus, for example, a magneto-optic disc device.

Note that, as the display device 34, the pointing device 36, and the control unit 38, it is also possible to use for example a notebook type personal computer.

Further, when the number of the video signals to be displayed becomes greater and can no longer be accommodated on the screen of the display device 34, the invention can be configured for scrolling by operation of the keyboard or the pointing device 38.

Further, the number of the video signals displayed in the frame 342 and the display method are examples. Even if a change is made in the display method, for example, the frame 342 is scrolled in the video signal editing apparatus 1, or a change is made in the sampling interval etc., these fall under the technical scope of the present invention.

Third Embodiment

Below, an explanation will be made of a third embodiment of the present invention.

An explanation will be made of the operation of the video signal editing apparatus 1 in the third embodiment when the operator of the video signal editing apparatus 1 designates a video signal displayed in the frame 342 by using a pointing device 36 and records the video signal necessary for the editing in the HD device 14.

The operator of the video signal editing apparatus 1 moves the pointer 346 shown in FIG. 4B by using the pointing device, for example, a mouse, and designates any of the video signals P1 to P20 displayed in the frame 342 by clicking.

The control unit 38 detects which of the video signals P1 to P20 is designated by the pointing device 36, controls the VTR apparatus 12, and, where for example the video signal PS is designated, reproduces the video signal from the video signal PS to the video signal P6.

Further, the control unit 38 makes the HD device 14 store the video signal reproduced by the VTR apparatus 12.

As explained above, if the video signal editing apparatus 1 is configured so that the part of the video signal to be stored in the HD device 14 is determined by designating the video signals P1 to P20 displayed in the frame 342, the operator can perform the work while viewing the content of the video signals, and therefore the work efficiency is very much improved.

Also, for the pointing device 36, other than the mouse, for example, a track ball can be used.

Also, further, as shown in FIG. 4B, if displaying a window 344 showing the operations with respect to the video signal editing apparatus 1 and designating this window 344 so as to enable the input of the operation information to the video signal editing apparatus, the operability is further improved.

When a portion of the video signal detected by the detection device 24 as being an important portion is designated, in most cases the "good scene" switch 482 is depressed after the important matter is produced, so it is preferable to configure the video signal editing apparatus 1 so as to display the video signal designated starting several seconds before the 1st bit of the sampling data becomes the logical value "1".

The video signal editing apparatus of the present invention can adopt various configurations as shown in the modifications explained here for example other than those shown in the embodiments mentioned above.

As mentioned above, according to the present invention, the time and labor of the work of finding a portion necessary for the editing work from a video signal recorded on a video tape can be reduced.

Also, according to the present invention, it is possible to move a part found from a video signal recorded on the video tape to a randomly accessible recording medium and use it for editing work and thereby improve the efficiency of the editing work.

Industrial Applicability

The video signal recording apparatus and video signal editing apparatus according to the present invention can be effectively used in an editing apparatus which edits video signals to produce programs for broadcasting and other various types of signal processing apparatuses.

We claim:

1. A video signal editing apparatus comprising:
   recording means for storing video signals and, in correspondence with the video signals, starting and ending signals for indicating starting and ending points representing a storage position of the stored video signals, and a designation signal designating a position of said video signals when an image located between said starting and ending points is designated for video capture;
   reproducing means for reproducing said video signals, said starting and ending signals, and said designation signals;
   monitor means for successively displaying in a predetermined array reduced-size images in accordance with said video signals;
   video reducing means for generating a reduced video signal representing a reduced-size version of an image represented by said video signal;
   sampling means for sampling said reduced video signal at predetermined intervals when a first mode is selected, and for sampling said reduced video signal at a position designated by at least one of said starting and ending signals and said read designation signal when a second mode is selected;
   pointing means for designating a reduced size image displayed on the monitor means;
   memory means for recording/reproducing said video signals reproduced by said reproducing means; and
   control means for controlling said reproducing means to reproduce at least one of said video scenes designated by said pointing means and for controlling said memory means for recording said video scene reproduced by said reproducing means.

2. The video signal editing apparatus according to claim 1, wherein said sampling means is operative to sample said reduced video signal from a point of time earlier than a point of time designated by said designating signal in said second mode.

3. A video signal editing apparatus for facilitating a reproduction operation when editing video scenes recorded on a video tape, wherein data indicating positions of said video scenes on said video tape is recorded on said video tape and data indicating positions of good scenes within said video scenes considered important to a user is recorded on said video tape, wherein said data indicating a position of said good scenes are recorded in successive positions of a longitudinal track disposed along said video tape adjacent said video scenes such that said data is recorded in successive positions of said longitudinal track from a position adjacent a start position of said good scenes to a position adjacent an end position of said good scenes thereby facilitating said reproduction operation when editing said good scenes, said apparatus comprising:
   display means for displaying said video scenes on a display;
   image reducing means for reducing said video scenes to a smaller size such that a plurality of image-reduced video scenes are displayable together by said display means;
   control means for controlling said display means to display only said good scenes, for controlling said image reducing means to reduce only said good scenes as indicated by said data recorded in said longitudinal track on said video tape, and for controlling said display means to display said good scenes reduced by said image reducing means as a plurality of image-reduced good scenes, thereby facilitating said reproduction operation for said good scenes during editing, wherein said control means causes said display means to display an editing window adjacent said good scenes reduced in size by said image reducing means for providing a plurality of editing commands selectable by said user;
   editing means for editing said good scenes displayed by said display means and reduced by said image reducing means;
   reproducing means for reproducing said video signals recorded on said tape;
   random access memory means for storing in randomly-accessed data storage positions data representing said video signals reproduced by said reproducing means;
   wherein said tape is advanced to a position where said data in said longitudinal track indicates the good scenes and said control means controls said reproducing means to reproduce said good scenes as the tape is advanced and controls said random access memory means to store said data representing said good scenes; and
   editing means for editing said good scenes stored in said random access memory means, so as to edit the good scenes displayed by said display means and reduced by said image reducing means.

4. A video signal editing apparatus for facilitating a reproduction operation when editing video scenes recorded on a video tape, wherein data indicating positions of said video scenes on said video tape is recorded on said video tape and data indicating positions of good scenes within said video scenes considered important to a user is recorded on said video tape, wherein said data indicating a position of said good scenes are recorded in successive positions of a longitudinal track disposed along said video tape adjacent said video scenes such that said data is recorded in successive positions of said longitudinal track from a position adjacent a start position of said good scenes to a position adjacent an end position of said good scenes thereby facilitating said reproduction operation when editing said good scenes, said apparatus comprising:

- display means for displaying said video scenes on a display;
- image reducing means for reducing said video scenes to a smaller size such that a plurality of image-reduced video scenes are displayable together by said display means;
- control means for controlling said display means to display only said good scenes, for controlling said image reducing means to reduce only said good scenes as indicated by said data recorded in said longitudinal track on said video tape, and for controlling said display means to display said good scenes reduced by said image reducing means as a plurality of image-reduced good scenes, thereby facilitating said reproduction operation for said good scenes during editing, wherein said control means causes said image reducing means to reduce an image positioned before said start position of a respective good scene corresponding to an event which is missed due to a timing selection of the respective good scene; and
- editing means for editing said good scenes displayed by said display means and reduced by said image reducing means.

* * * * *